United States Patent
Miura (10) Patent No.: US 7,165,392 B2
(45) Date of Patent: Jan. 23, 2007

(54) EXHAUST GAS PURIFYING SYSTEM FOR ENGINE

(75) Inventor: Manabu Miura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 91 days.

(21) Appl. No.: 10/853,759

(22) Filed: May 26, 2004

(65) Prior Publication Data

US 2004/0250535 A1 Dec. 16, 2004

(30) Foreign Application Priority Data

Jun. 11, 2003 (JP) ............... 2003-166044

(51) Int. Cl.
*F01N 3/00* (2006.01)
*F01N 3/10* (2006.01)

(52) U.S. Cl. ............ 60/285; 60/284; 60/287; 60/300

(58) Field of Classification Search ......... 60/284, 60/285, 287
See application file for complete search history.

(56) References Cited

U.S. PATENT DOCUMENTS

| | | | | |
|---|---|---|---|---|
| 3,943,709 A | * | 3/1976 | Holt | 60/274 |
| 4,211,075 A | * | 7/1980 | Ludecke et al. | 60/285 |
| 4,756,155 A | * | 7/1988 | Shinzawa | 60/285 |
| 5,287,698 A | * | 2/1994 | Shinzawa et al. | 60/286 |
| 5,713,198 A | * | 2/1998 | Aoki et al. | 60/277 |
| 5,887,422 A | * | 3/1999 | Abe et al. | 60/274 |
| 6,041,593 A | * | 3/2000 | Karlsson et al. | 60/284 |
| 6,212,884 B1 | * | 4/2001 | Ohuchi et al. | 60/285 |
| 6,345,499 B1 | * | 2/2002 | Nishimura et al. | 60/277 |
| 6,378,298 B2 | * | 4/2002 | Harima et al. | 60/288 |
| 6,601,383 B2 | * | 8/2003 | Hasegawa et al. | 60/276 |
| 6,851,258 B2 | * | 2/2005 | Kawashima et al. | 60/311 |

FOREIGN PATENT DOCUMENTS

JP 2000-18024 A 1/2000

* cited by examiner

*Primary Examiner*—Thomas Denion
*Assistant Examiner*—Loren Edwards
(74) *Attorney, Agent, or Firm*—Foley & Lardner LLP

(57) ABSTRACT

An exhaust gas purifying system for an engine, including a HC trap catalyst disposed in an exhaust passage and operative to trap HC contained in the exhaust gas, and a control unit being programmed to: upon activating the HC trap catalyst after the engine is started, control a target excess air ratio to a preset value smaller than a normal value to which the target excess air ratio is controlled when the HC trap catalyst is activated, to thereby rise an exhaust gas temperature; and increase the target excess air ratio as the temperature of the HC trap catalyst rises, to thereby increase a heat quantity generated upon oxidation of the HC trapped by the HC trap catalyst.

21 Claims, 11 Drawing Sheets

EXHAUST GAS PURIFYING SYSTEM FOR ENGINE

BACKGROUND OF THE INVENTION

The present invention relates to a system for purifying exhaust gas emitted from an engine, which includes a HC trap catalyst for trapping hydrocarbons, referred to hereinafter as HC, and specifically, relates to a technology of allowing for rising a temperature of the exhaust gas and promoting activation of the HC trap catalyst using heat quantity of the exhaust gas.

An exhaust gas purifying system for engines, which includes a HC trap catalyst is well known. The HC trap catalyst is constructed to trap HC contained in exhaust gas emitted from the engine when the HC trap catalyst is in a low temperature condition. Further, when temperature of the exhaust gas rises, the HC trap catalyst purifies nitrogen oxides, referred to hereinafter as NOx, which are contained in the exhaust gas, by the effect of HC trapped by the HC trap catalyst as a reducing agent. Here, if the HC trap catalyst traps sulfur components more than a given amount thereof, the HC trap catalyst will be deteriorated in capability. The HC trap catalyst, therefore, must be periodically heated to remove the sulfur components trapped therein.

Japanese Patent Application First Publication No. 2000-018024 shows an emission control for diesel engines, which uses a light oil adding device. When an exhaust gas purifying catalyst is heated for removing the sulfur components trapped, an excess air ratio is adjusted in the range of 1 to 1.5 by controlling an intake throttle valve and an exhaust gas recirculation valve. Further, the light oil adding device is actuated to mix light oil into exhaust gas, depending on a remaining oxygen content in exhaust gas. The exhaust gas mixed with light oil is introduced into the catalyst in which the light oil in the exhaust gas is oxidized. The catalyst is heated using heat generated upon the oxidation of the light oil.

SUMMARY OF THE INVENTION

However, the heating of the HC trap catalyst using the light oil adding device as described in the related art will be effective only in a condition that the HC trap catalyst is in the activated state. Even through the heating of the HC trap catalyst using the light oil adding device is attempted immediately after start-up of an engine in order to quickly activate the HC trap catalyst, the temperature of the HC trap catalyst will fail to be sufficiently raised. The light oil introduced into the exhaust gas, therefore, cannot be oxidized in the HC trap catalyst and will be emitted into atmosphere as it is. This results in deteriorating the emission from the engine.

It is an object of the present invention to provide a system for promoting activation of a HC trap catalyst without deteriorating emission from an engine.

In one aspect of the present invention, there is provided a system for purifying exhaust gas passing through an exhaust passage in an engine, the system comprising:
a HC trap catalyst disposed in the exhaust passage, the HC trap catalyst being operative to trap HC contained in the exhaust gas; and
a control unit being programmed to:
calculate a HC quantity trapped by the HC trap catalyst;
calculate a temperature of the HC trap catalyst;
judge whether or not the HC trap catalyst is activated; and
control a target excess air ratio to a preset value that is smaller than a normal value and determined based on the calculated HC quantity trapped by the HC trap catalyst and the calculated temperature of the HC trap catalyst, during a time period from starting the engine to judging that the HC trap catalyst is activated, to thereby rise an exhaust gas temperature.

In a further aspect of the present invention, there is provided a system for purifying exhaust gas passing through an exhaust passage in an engine, the system comprising:
a HC trap catalyst disposed in the exhaust passage, the HC trap catalyst being operative to trap HC contained in the exhaust gas; and
a control unit being programmed to:
calculate a temperature of the HC trap catalyst;
judge that the HC trap catalyst is activated when the calculated temperature of the HC trap catalyst is not less than a first temperature; and
control a target excess air ratio smaller than a normal value during a time period from starting the engine to judging that the HC trap catalyst is activated, to thereby rise an exhaust gas temperature,
wherein the control unit is programmed to control the target excess air ratio to a first preset value when the calculated temperature of the HC trap catalyst is lower than a second temperature lower than the first temperature, and control the target excess air ratio to a second preset value different from the first preset value when the calculated temperature of the HC trap catalyst is not less than the second temperature.

In a still further aspect of the present invention, there is provided a system for purifying exhaust gas passing through an exhaust passage in an engine, the system comprising:
a HC trap catalyst disposed in the exhaust passage, the HC trap catalyst being operative to trap HC contained in the exhaust gas; and
a control unit being programmed to: upon activating the HC trap catalyst after the engine is started, control a target excess air ratio to a preset value smaller than a normal value to which the target excess air ratio is controlled when the HC trap catalyst is activated, to thereby rise an exhaust gas temperature; and increase the target excess air ratio as the temperature of the HC trap catalyst rises, to thereby increase a heat quantity generated upon oxidation of the HC trapped by the HC trap catalyst.

In a still further aspect of the present invention, there is provided a method for purifying exhaust gas passing through an exhaust passage in an engine, a HC trap catalyst being disposed in the exhaust passage and adapted to trap HC contained in the exhaust gas, the method comprising:
calculating a temperature of the HC trap catalyst;
judging whether or not the HC trap catalyst is activated based on the calculated temperature of the HC trap catalyst; and controlling a target excess air ratio smaller than a normal value to which the target excess air ratio is controlled when the HC trap catalyst is activated, based on the calculated temperature of the HC trap catalyst, during a time period from starting the engine to judging that the HC trap catalyst is activated.

DETAILED DESCRIPTION OF THE INVENTION

Figure 1:
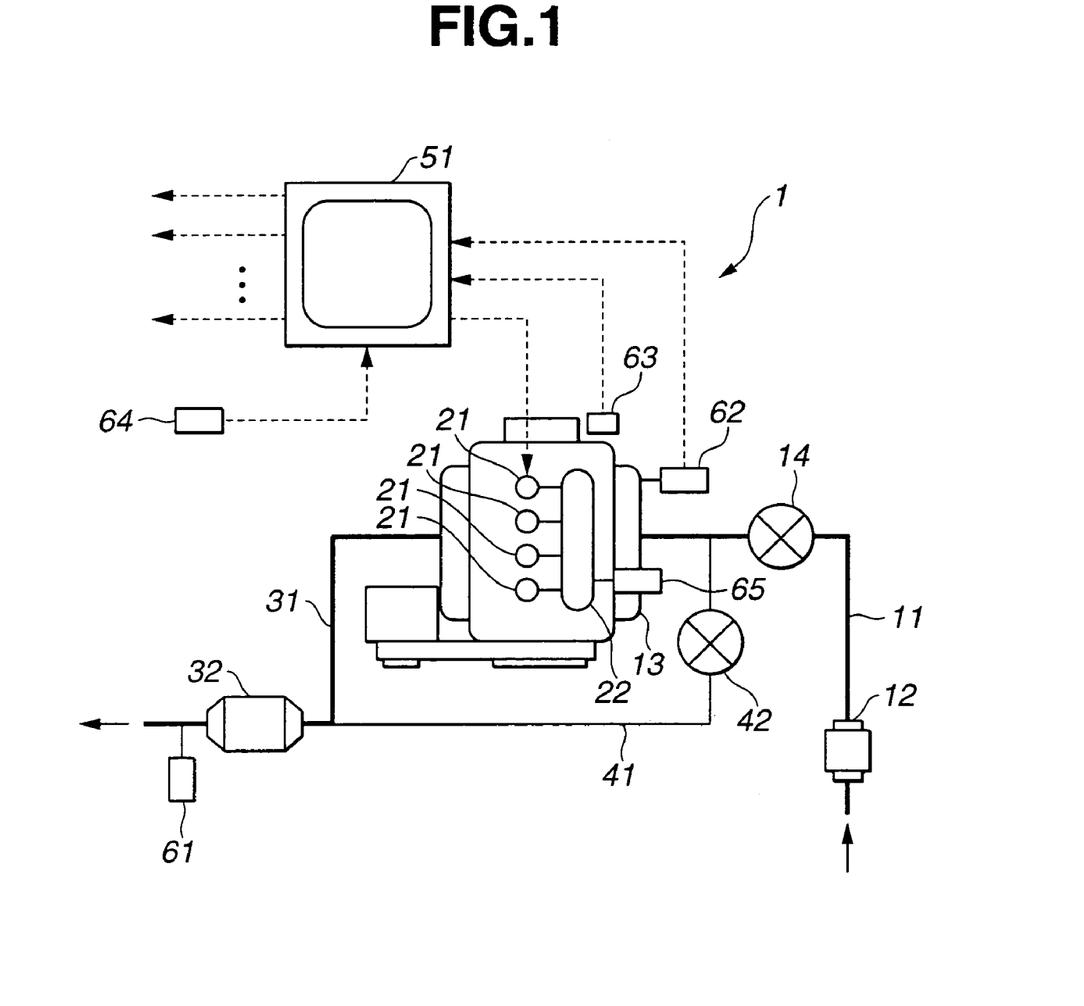
FIG. 1 is a schematic diagram illustrating a diesel engine to which an exhaust gas purifying system according to a first embodiment of the present invention is applicable.

Referring to FIGS. 1–16, an exhaust gas purifying system, according to a first embodiment of the present invention, now is explained. In this embodiment, the system is applied to a direct injection diesel engine, referred to hereinafter merely as an engine. As illustrated in FIG. 1, engine 1 includes intake passage 11 into which intake air is introduced. The intake air flowing into an inlet portion of intake passage 11 is filtered at an air cleaner, not shown, where dust in the intake air is removed. Airflow meter 12 is disposed in intake passage 11 downstream of the air cleaner and measures a quantity of intake air flowing therethrough. The intake air passing through the air cleaner and airflow meter 12 flows into surge tank 13 via intake throttle valve 14. The intake air then flows into an intake manifold and is distributed to respective engine cylinders. Intake throttle valve 14 is electronically connected to electronic control unit, referred to hereinafter as ECU, 51. Intake throttle valve 14 is operative to control an intake air quantity in response to a control signal transmitted from ECU 51.

Fuel injectors 21 are arranged to be opposed to an upper central portion of a combustion chamber of each of the engine cylinders of engine 1. Fuel discharged from a fuel pump, not shown, is supplied at a predetermined pressure to fuel injectors 21 via common rail 22 and injected within the combustion chamber.

HC trap catalyst 32 is disposed in exhaust passage 31 downstream of an exhaust manifold. HC trap catalyst 32 is designed to trap HC from exhaust gas when a temperature of HC trap catalyst 32 is low, for instance, upon or immediately after start-up of engine 1. When the engine operation continues and an exhaust gas temperature rises, NOx in the exhaust gas react with HC trapped by HC trap catalyst 32 so that NOx is reduced and HC is suitably treated. Exhaust gas temperature sensor 61 for detecting the exhaust gas temperature is disposed downstream of HC trap catalyst 32.

Exhaust passage 31 is connected with intake passage 11 via EGR line 41. EGR valve 42 is disposed in EGR pipe 41. EGR valve 42 is operative in response to a control signal transmitted from ECU 51, to vary an opening degree thereof and thereby control an exhaust gas quantity to be recirculated to intake passage 11.

In addition to airflow meter 12 and exhaust gas temperature sensor 61, various sensors for detecting an operating condition of engine 1 are coupled to ECU 51. The sensors include water temperature sensor 62, crank angle sensor 63, accelerator sensor 64 and fuel pressure sensor 65. Water temperature sensor 62 detects an engine cooling water temperature and generates a signal indicative of the detected engine cooling water temperature. Crank angle sensor 63 detects a crank angle and generates a signal indicative of the detected crank angle. Accelerator sensor 64 detects an opening degree of an accelerator and generates a signal indicative of the detected accelerator opening degree. Fuel pressure sensor 65 detects a pressure of fuel supplied to fuel injectors 21 and generates a signal indicative of the detected fuel pressure. ECU 51 receives the signals generated from the sensors and processes the signals to determine the engine operating condition. Depending on the engine operating condition, ECU 51 performs various controls as explained below. ECU 51 includes one or more microcomputers each including a central processing unit (CPU), a read-only memory (ROM), a random access memory (RAM), and input/output interface (I/O interface).

Figure 2:
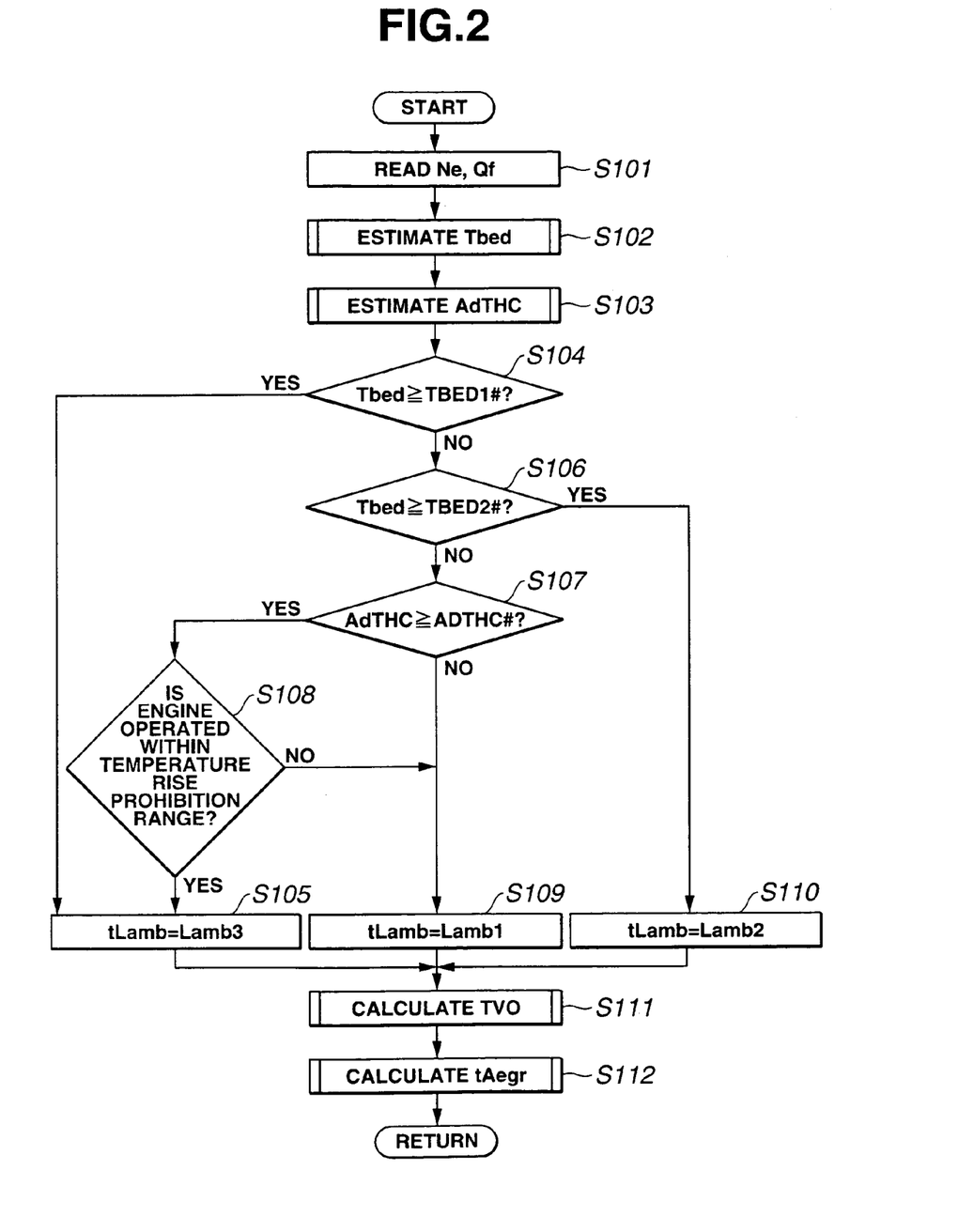
FIG. 2 is a flowchart of a routine executed for calculating excess air ratio.
Figure 3:
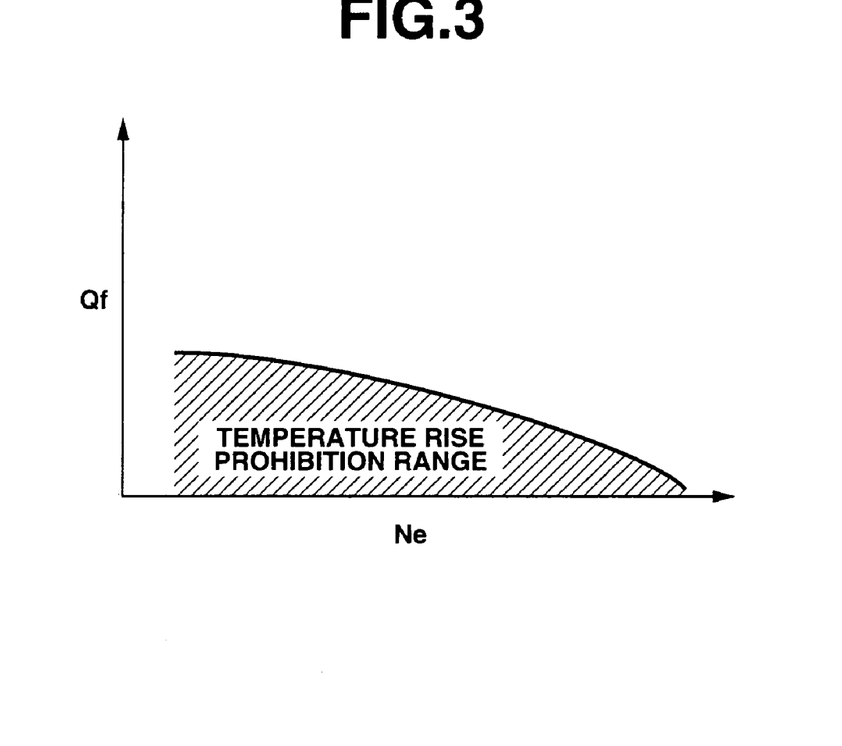
FIG. 3 is a map illustrating a temperature rise prohibition range.

Referring to FIG. 2, a flow of a routine for calculating a target excess air ratio, which is implemented by ECU 51, is explained. The routine is executed at a predetermined interval, for instance, twenty milliseconds. Logic flow starts and goes to block S101 where engine speed Ne and fuel injection quantity Qf are read. Engine speed Ne is calculated based on the crank angle signal from crank angle sensor 63. Fuel injection quantity Qf is calculated based on the accelerator opening degree signal from accelerator sensor 64. At block S102, HC trap catalyst temperature Tbed is determined as an estimate by calculation as described later. The logic then goes to block S103 where HC quantity AdTHC trapped by HC trap catalyst 32 is determined as an estimate by calculation as described later.

At block S104, an interrogation is made whether or not HC trap catalyst temperature Tbed is not less than first temperature TBED1#. First temperature TBED1# is a temperature at which HC trap catalyst 32 is activated. If, at block S104, the interrogation is in affirmative, the logic goes to block S105. At block S105, target excess air ratio tLamb is set to normal value Lamb3 that is larger than 1. If, at block S104, the interrogation is in negative, the logic goes to block S106. At block S106, an interrogation is made whether or not HC trap catalyst temperature Tbed is not less than second temperature TBED2# lower than first temperature TBED1#. Second temperature TBED2# is a temperature at which the oxidation of HC trapped by HC trap catalyst 32 can be initiated. If, at block S106, the interrogation is in negative, the logic goes to block S107.

At block S107, an interrogation is made whether or not HC quantity AdTHC trapped by HC trap catalyst 32 is not less than preset value ADTHC# that is an upper limit of the HC trap capability of HC trap catalyst 32. If, at block S107, the interrogation is in affirmative, the logic goes to block S108. At block S108, an interrogation is made whether or not engine 1 is operated within a temperature rise prohibition range, by searching a map shown in FIG. 3. The map shows the temperature rise prohibition range determined based on engine speed Ne and fuel injection quantity Qf. The temperature rise prohibition range is a range in which reduction of the excess air ratio produces insufficient increase in the exhaust gas temperature, and rather causes deterioration of emission from engine 1. If, at block S108, the interrogation is in affirmative, the logic goes to block S105. At block S105, target excess air ratio tLamb is set to normal value Lamb3 in order to restrain HC generation after the time at which trapped HC quantity AdTHC reaches the upper limit of the HC trap capability of HC trap catalyst 32. If, at block S108, the interrogation is in negative, the logic goes to block S109. At block S109, target excess air ratio tLamb is set to preset value Lamb1 smaller than normal value Lamb3. For instance, preset value Lamb1 is 1.

If, at block S106, the interrogation is in affirmative, indicating that HC trap catalyst temperature Tbed is not less than second temperature TBED2#, the logic goes to block S110. At block S110, target excess air ratio tLamb is set to preset value Lamb2 that is smaller than normal value Lamb3 and larger than preset value Lamb1. For instance, preset value Lamb2 is larger than 1 but smaller than normal value Lamb3.

At block S111, target opening degree TVO of intake throttle valve 14 is calculated. The logic goes to block S112 where target opening degree tAegr of EGR valve 42 is calculated.

Figure 4:
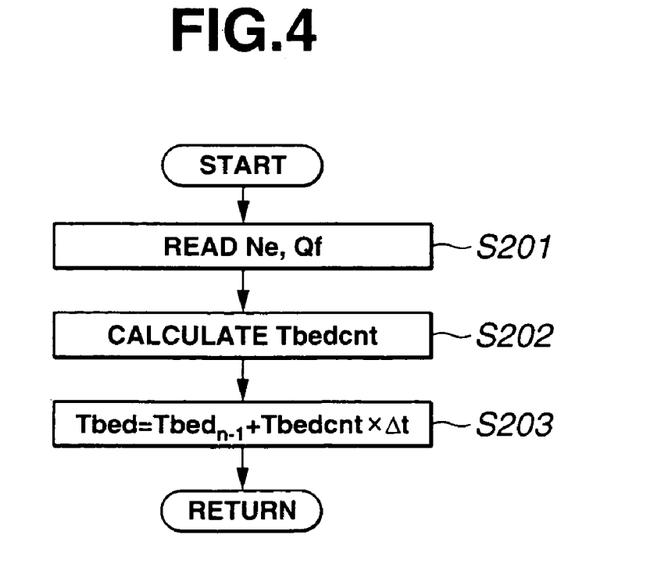
FIG. 4 is a flowchart of a routine executed for calculating a temperature of a HC trap catalyst.
Figure 5:
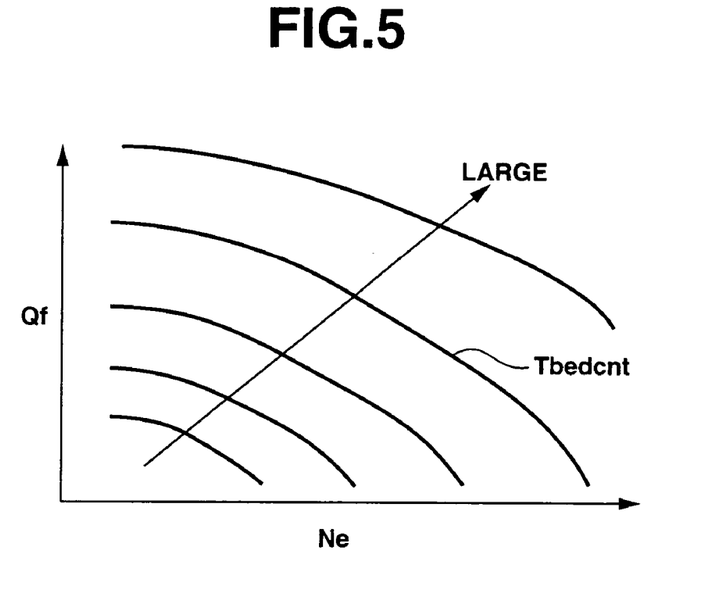
FIG. 5 is a map illustrating a temperature rise rate of the HC trap catalyst.

Referring to FIG. 4, a flow of a routine for calculating HC trap catalyst temperature Tbed, which is implemented by ECU 51, is explained. The routine is executed at a predetermined interval, for instance, 100 milliseconds. Logic flow starts and goes to block S201 where engine speed Ne and fuel injection quantity Qf are read. At block S202, temperature rise rate Tbedcnt of HC trap catalyst 32 is calculated by searching a map shown in FIG. 5, based on engine speed Ne and fuel injection quantity Qf. Temperature rise rate Tbedcnt is a rate of increase in temperature of HC trap catalyst 32 per unit time which is caused by heat transfer from the exhaust gas. The map of FIG. 5 shows temperature rise rate Tbedcnt determined based on engine speed Ne and fuel injection quantity Qf. As illustrated in FIG. 5, as engine speed Ne and fuel injection quantity Qf increase, temperature rise rate Tbedcnt becomes larger. The logic then goes to block S203 where HC trap catalyst temperature Tbed is calculated according to the following equation (1).

$$Tbed = Tbed_{n-1} + Tbedcnt \times \Delta t \quad (1)$$

where, $Tbed_{n-1}$ is HC trap catalyst temperature calculated upon previously executing this routine, and $\Delta t$ is calculation period.

Figure 6:
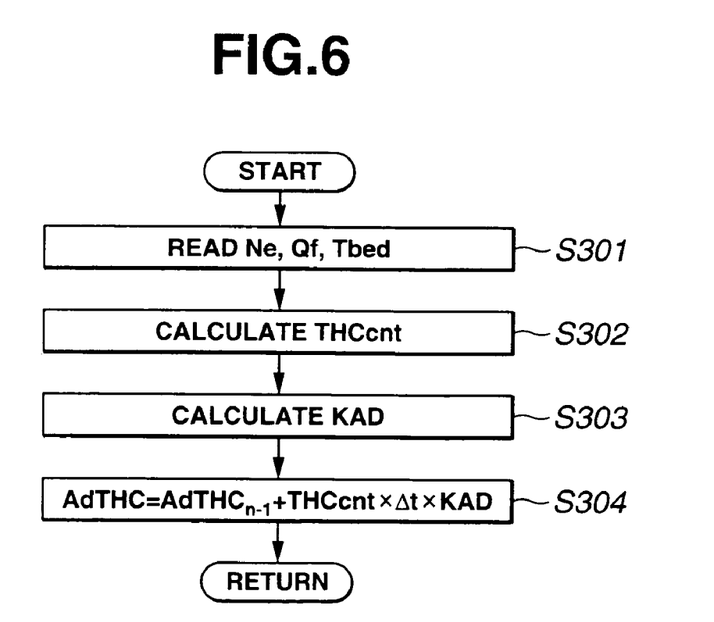
FIG. 6 is a flowchart of a routine executed for calculating a HC quantity trapped by the HC trap catalyst.
Figure 7:
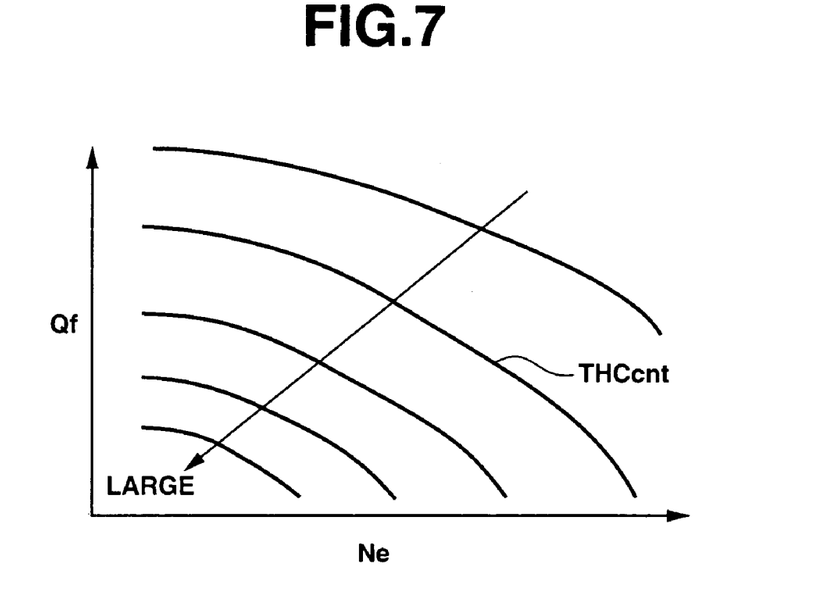
FIG. 7 is a map illustrating a HC quantity emitted from the diesel engine.

Referring to FIG. 6, a flow of a routine for calculating HC quantity AdTHC trapped by HC trap catalyst 32, which is implemented by ECU 51, is explained. The routine is executed at a predetermined interval, for instance, 100 milliseconds. Logic flow starts and goes to block S301 where engine speed Ne, fuel injection quantity Qf and HC trap catalyst temperature Tbed are read. At block S302, HC discharge quantity THCcnt is calculated by searching a map shown in FIG. 7, based on engine speed Ne and fuel injection quantity Qf. HC discharge quantity THCcnt is a HC quantity discharged from engine 1 per unit time. The map of FIG. 7 shows HC discharge quantity THCcnt determined based on engine speed Ne and fuel injection quantity Qf. As illustrated in FIG. 7, as engine speed Ne and fuel injection quantity Qf decrease, HC discharge quantity THCcnt becomes larger.

Figure 8:
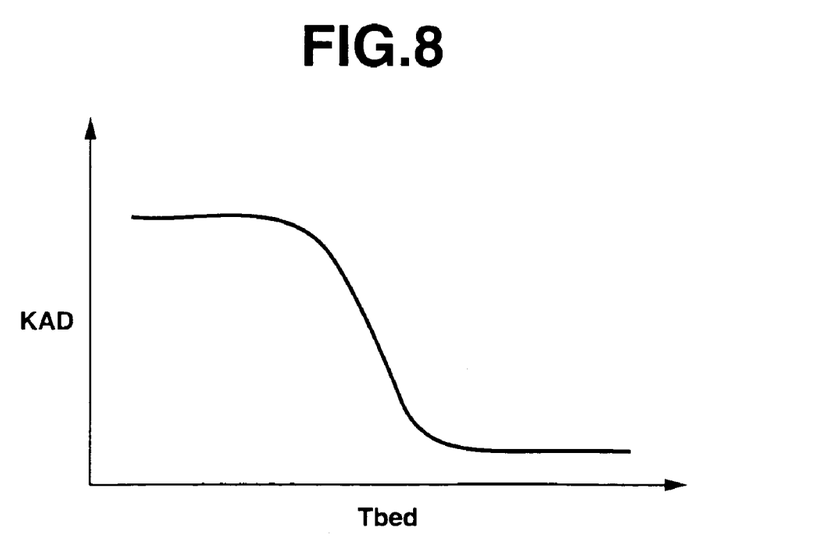
FIG. 8 is a table showing the trapped HC quantity correction coefficient.

At block S303, correction coefficient KAD for HC quantity AdTHC trapped by HC trap catalyst 32 is calculated by searching a table shown in FIG. 8, based on HC trap catalyst temperature Tbed. Correction coefficient KAD indicates the HC trap characteristic of HC trap catalyst 32 which varies depending on the temperature of HC trap catalyst 32. As illustrated in FIG. 8, as HC trap catalyst temperature Tbed increases, correction coefficient KAD becomes smaller. The logic then goes to block S304 where trapped HC quantity AdTHC is calculated according to the following equation (2).

$$AdTHC = AdTHC_{n-1} + THCcnt \times \Delta t \times KAD \quad (2)$$

where, $AdTHC_{n-1}$ is trapped HC quantity calculated upon previously executing this routine, THCcnt is HC discharge quantity, $\Delta t$ is calculation period, and KAD is correction coefficient.

Figure 9:
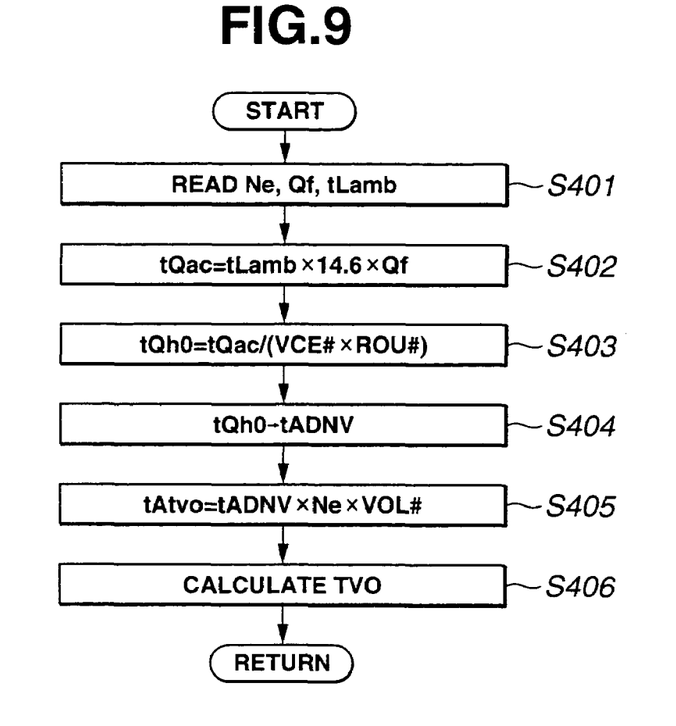
FIG. 9 is a flowchart of a routine executed for calculating a target opening degree of an intake throttle valve.

Referring to FIG. 9, a flow of a routine for calculating target opening degree TVO of intake throttle valve 14, which is implemented by ECU 51, is explained. The routine is executed at a predetermined interval, for instance, 20 milliseconds. Logic flow starts and goes to block S401 where engine speed Ne, fuel injection quantity Qf and target excess air ratio tLamb are read. At block S402, target intake air quantity tQac is calculated according to the following equation (3) based on fuel injection quantity Qf and target excess air ratio tLamb.

$$tQac = tLamb \times 14.6 \times Qf \quad (3)$$

where 14.6 is stoichiometric air/fuel ratio.

At block S403, target air charge rate tQh0 is calculated according to the following equation (4) based on target intake air quantity tQac.

$$tQh0 = tQac/(VCE\# \times ROU\#) \quad (4)$$

where VCE# is displacement per one engine cylinder, and ROU# is air density.

Figure 10:
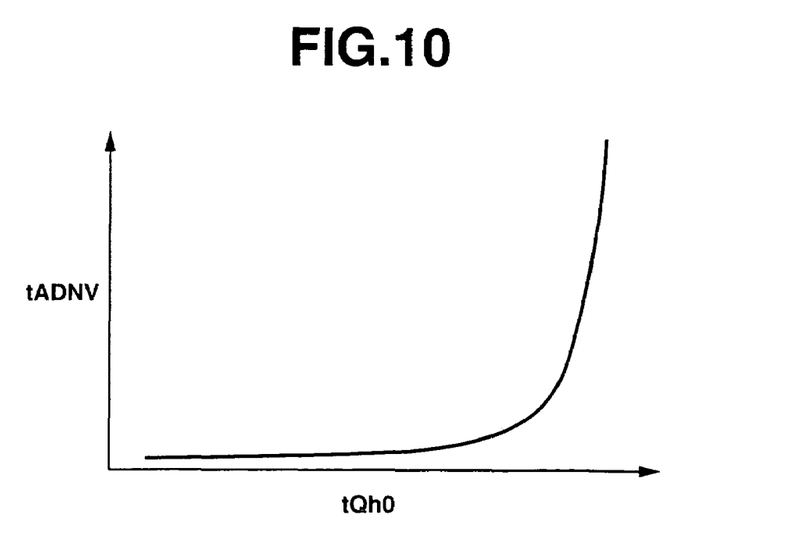
FIG. 10 is a table showing a relationship between a target airflow ratio and a target air charge rate.

At block S404, target airflow ratio tADNV is calculated by searching a table shown in FIG. 10, based on target charge rate tQh0. The table of FIG. 10 shows a relationship between target airflow ratio tADNV and target charge rate tQh0. At block S405, target opening area tAtvo of intake throttle valve 14 is calculated according to the following equation (5) based on target airflow ratio tADNV and engine speed Ne.

$$tAtvo = tADNV \times Ne \times VOL\# \quad (5)$$

where VOL# is a sum of the displacements of engine cylinders.

Figure 11:
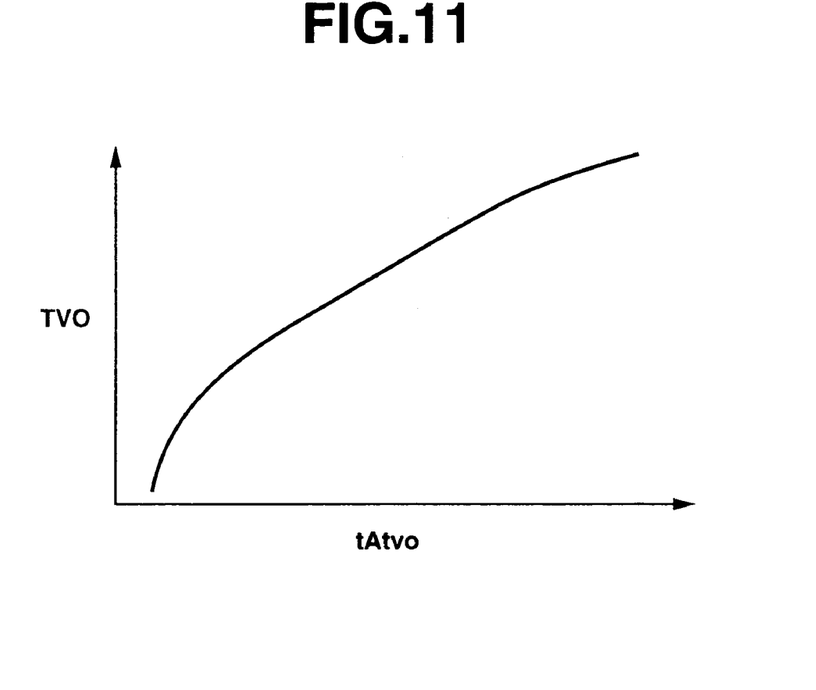
FIG. 11 is a table showing a relationship between the target opening degree of the intake throttle valve and a target opening area of the intake throttle valve.

At block S406, target opening degree TVO of intake throttle valve 14 is calculated by searching a table shown in FIG. 11, based on target opening area tAtvo of intake throttle valve 14. The table of FIG. 11 shows target opening degree TVO of intake throttle valve 14 which becomes larger as target opening area tAtvo thereof increases.

Figure 12:
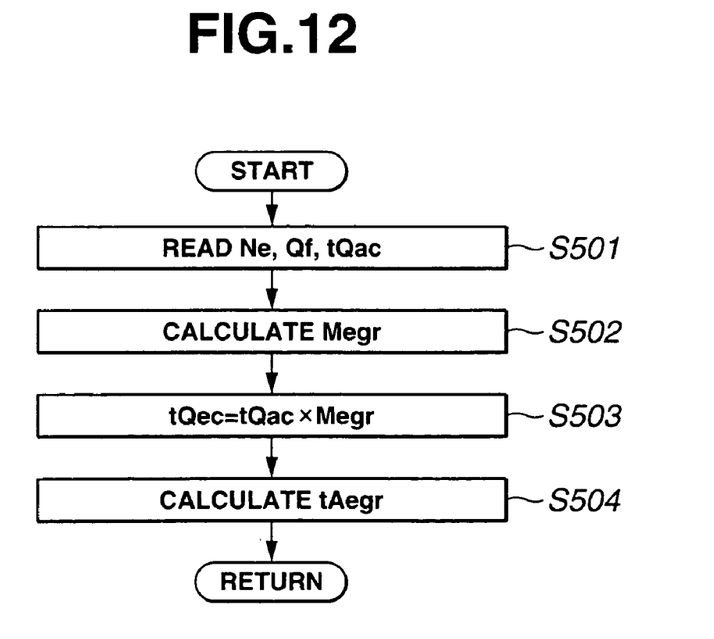
FIG. 12 is a flowchart of a routine executed for calculating a target opening degree of an exhaust gas recirculation (EGR) valve.
Figure 13:
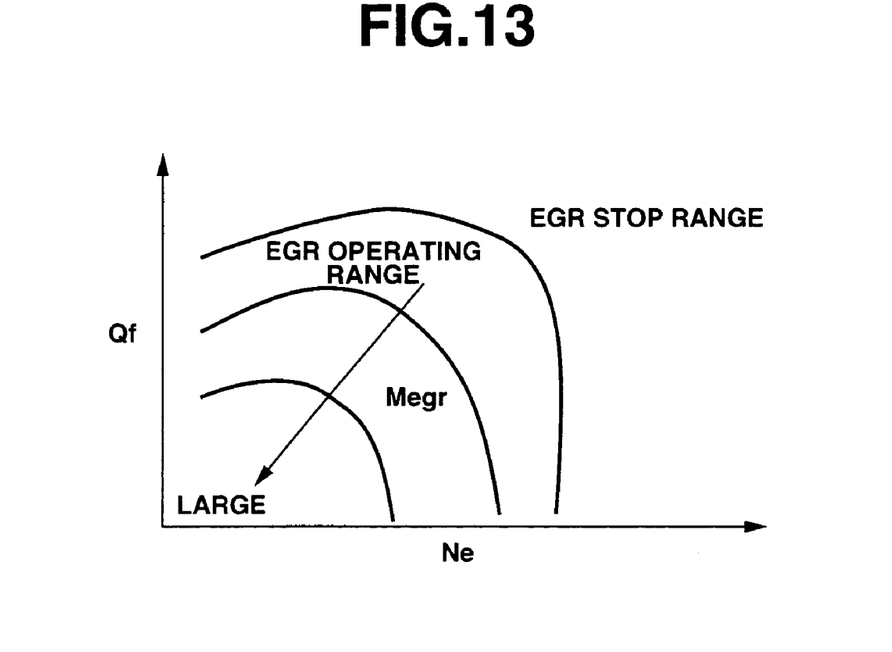
FIG. 13 is a map illustrating a target EGR rate.

Referring to FIG. 12, a flow of a routine for calculating target opening degree tAegr of EGR valve 42, which is implemented by ECU 51, is explained. The routine is executed at a predetermined interval, for instance, 20 milliseconds. Logic flow starts and goes to block S501 where engine speed Ne, fuel injection quantity Qf and target intake air quantity tQac are read. At block S502, target EGR rate Megr is calculated by searching a map shown in FIG. 13 based on engine speed Ne and fuel injection quantity Qf. The map of FIG. 13 shows target EGR rate Megr determined based on engine speed Ne and fuel injection quantity Qf. At block S503, target EGR quantity tQec is calculated according to the following equation (6) based on target intake air quantity tQac and target EGR rate Megr.

$$tQec = tQac \times Megr \quad (6)$$

Figure 14:
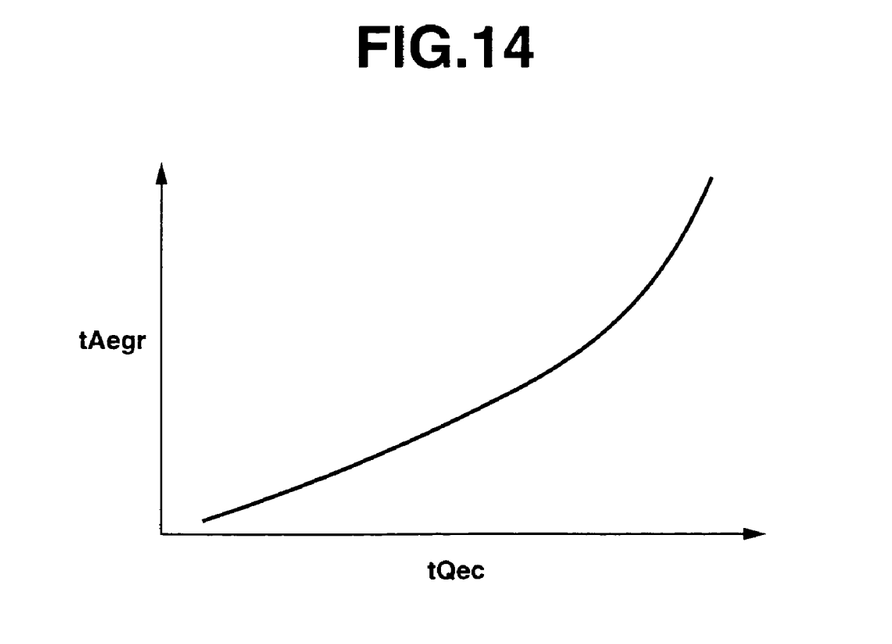
FIG. 14 is a table showing a relationship between the target opening degree of the EGR valve and a target EGR quantity.

At block S504, target opening degree tAegr of EGR valve 42 is calculated by searching a table shown in FIG. 14, based on target EGR quantity tQec. The table of FIG. 14 shows target opening degree tAegr of EGR valve 42 which becomes larger as target EGR quantity tQec increases.

Figure 15:
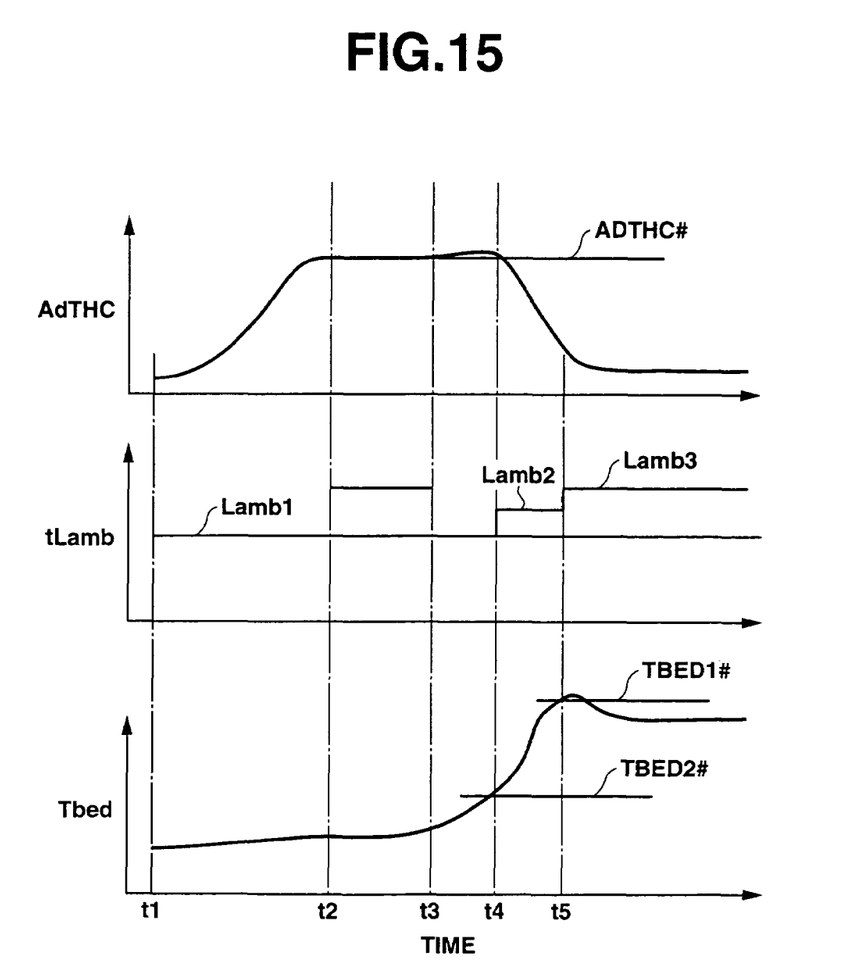
FIG. 15 is a diagram illustrating changes in the trapped HC quantity, the target excess air ratio and the temperature of the HC trap catalyst with respect to the elapsed time after start-up of the diesel engine.

Referring to FIG. 15, the control executed by ECU 51 is explained. FIG. 15 is a timing chart showing changes of trapped HC quantity AdTHC, target excess air ratio tLamb and HC trap catalyst temperature Tbed, since engine 1 starts. In FIG. 15, time t1 indicates the moment engine 1 starts. At time t1 trapped HC quantity AdTHC is almost zero, and HC trap catalyst temperature Tbed is below the activation temperature. When engine 1 starts, ECU 51 controls target excess air ratio tLamb to preset value Lamb1 smaller than normal value Lamb3 in order to activate HC trap catalyst 32. This causes rise of the exhaust gas temperature, resulting in increase in HC trap catalyst temperature Tbed due to heat transfer from the exhaust gas. At this time, HC trap catalyst 32 is in a low temperature condition and traps relatively large quantity of HC contained in the exhaust gas from engine 1. At time t2 at which trapped HC quantity AdTHC reaches preset value ADTHC# before HC trap catalyst temperature Tbed reaches preset temperature TBED2# lower than the activation temperature, ECU 51 controls target excess air ratio tLamb to normal value Lamb3 under condition that the engine operating condition is in temperature rise prohibition range. Subsequently, at time t3 at which the engine operating condition comes out of temperature rise prohibition range, ECU 51 controls target excess air ratio tLamb to preset value Lamb1 . At time t4 at which HC trap catalyst temperature Tbed reaches preset temperature TBED2#, ECU 51 controls target excess air ratio tLamb to preset value Lamb2 larger than preset value Lamb1 and smaller than normal value Lamb3. As a result, oxygen contents in the exhaust gas increases, while the exhaust gas temperature decreases. This causes increase in heat quantity generated by oxidation of the HC trapped by HC trap catalyst 32. Therefore, a sum of the heat quantities received by HC trap catalyst 32 is increased, so that HC trap catalyst temperature Tbed rapidly rises. At time t5 at which HC trap catalyst temperature Tbed reaches preset temperature TBED1#, ECU 51 judges that HC trap catalyst 32 is activated and then control target excess air ratio tLamb to normal value Lamb3.

Figure 16:
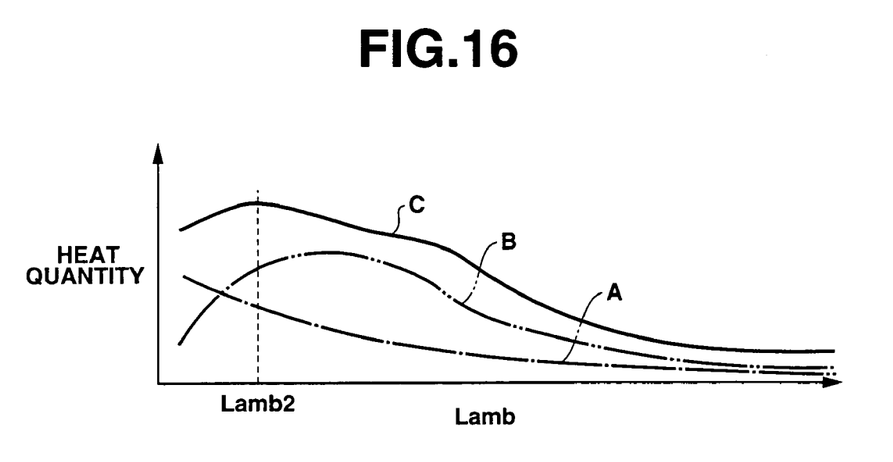
FIG. 16 is a graph illustrating changes in exhaust gas transport heat quantity, oxidation heat quantity and a sum of the exhaust gas transport heat quantity and the oxidation heat quantity, with respect to the target excess air ratio.

FIG. 16 shows changes in exhaust gas transport heat quantity, oxidation heat quantity and a sum of the exhaust gas transport heat quantity and the oxidation heat quantity, upon changing target excess air ratio tLamb at constant trapped HC quantity AdTHC. In FIG. 16, curve A indicates the change in the heat quantity transported by the exhaust gas, curve B indicates the change in the heat quantity generated upon oxidation of the HC trapped by HC trap catalyst 32, and curve C indicates the change in the sum of the heat quantity transported by the exhaust gas and the heat quantity generated upon oxidation of the HC trapped. By suitably setting preset value Lamb2 of target excess air ratio tLamb, a sum of the heat quantity transported by the exhaust gas and the heat quantity generated upon oxidation of the HC trapped can become larger than the heat quantity transported by the exhaust gas when target excess air ratio tLamb is kept at preset value Lamb1 . This allows promotion of activation of HC trap catalyst 32.

According to the first embodiment of the present invention, the following effects can be attained. First, when HC trap catalyst 32 is in inactivated condition, target excess air ratio tLamb is set to preset value Lamb1 smaller than normal value Lamb3 to thereby increase a temperature of exhaust gas. Owing to heat transfer from the exhaust gas, HC trap catalyst 32 is heated. This can serve for reducing time required to activate HC trap catalyst 32.

Second, heat quantity generated by oxidation of HC trapped by HC trap catalyst 32 is controlled by shifting target excess air ratio tLamb between preset value Lamb1 , preset value Lamb2 and normal value Lamb3 depending on the rise of HC trap catalyst temperature Tbed. The heat quantity generated is utilized for heating HC trap catalyst 32. As a result, fuel economy can be improved. Further, target excess air ratio tLamb is set to preset value Lamb2 at which the sum of the exhaust gas transport heat quantity and the oxidation heat quantity be maximized. This can effectively heat HC trap catalyst 32.

Third, when trapped HC quantity AdTHC reaches or exceeds preset value ADTHC# as the upper limit of the HC trap capability of HC trap catalyst 32, even before activation of HC trap catalyst 32, target excess air ratio tLamb is controlled to normal value Lamb3 under condition that the engine operating condition is in the temperature rise prohibition range. This can restrain deterioration of emission from engine 1.

Figure 17:
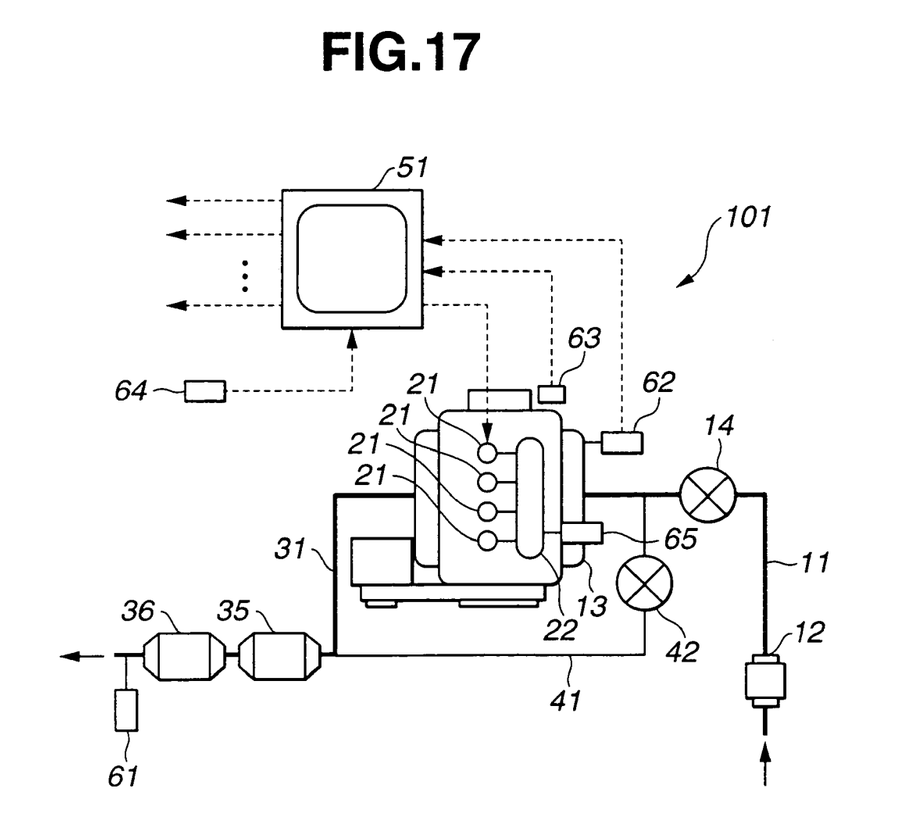
FIG. 17 is a schematic diagram similar to FIG. 1, but illustrating the exhaust gas purifying apparatus according to a second embodiment of the present invention.

Referring to FIG. 17, a second embodiment of the exhaust gas purifying apparatus is explained. The second embodiment differs in that an upstream catalyst and a downstream catalyst are arranged in series in exhaust passage 31, from the first embodiment in which HC trap catalyst 32 has both of HC trap capability and HC oxidation capability. Like reference numerals denote like parts, and therefore, detailed explanations therefor are omitted. Upstream catalyst 35 is designed to trap HC contained in exhaust gas that is emitted from engine 101. Downstream catalyst 36 is designed to oxidize HC.

HC trap catalyst temperature Tbed is not limited to the estimate based on engine operating condition, and may be an approximate value using the exhaust gas temperature detected by exhaust gas temperature sensor 61. This is because the exhaust gas temperature detected downstream of HC trap catalyst 32 is determined by heat transfer from the exhaust gas to HC trap catalyst 32, and therefore, is substantially equivalent to HC trap catalyst temperature Tbed.

Figure 18:
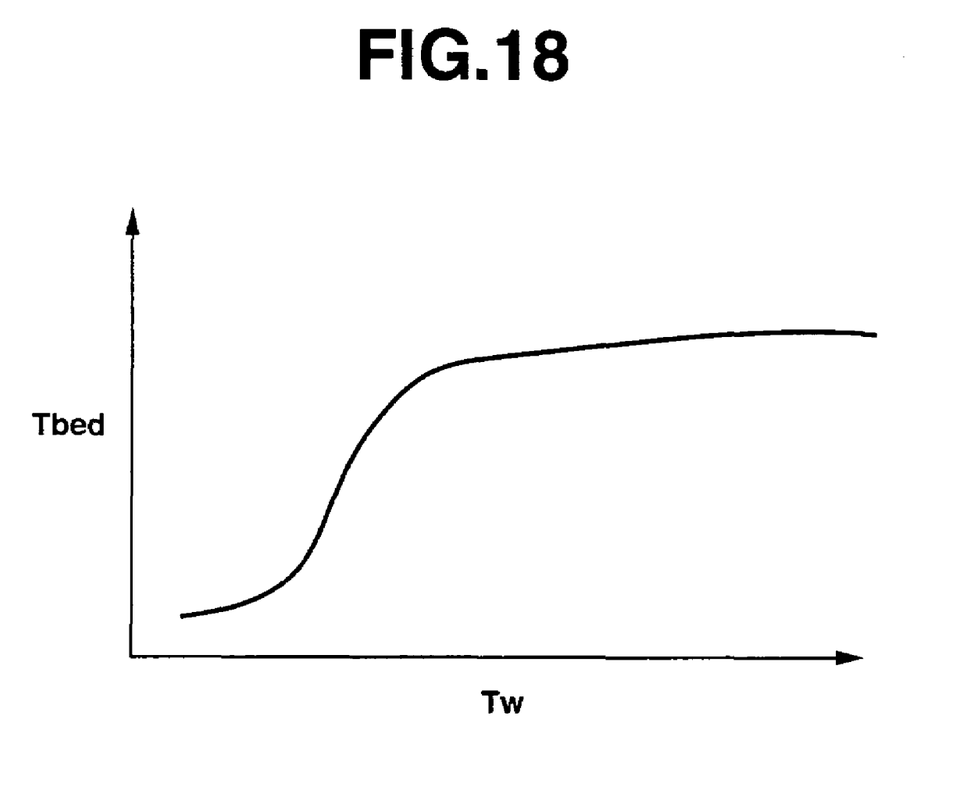
FIG. 18 is a table showing a relationship between the temperature of the HC trap catalyst and a temperature of engine cooling water.

Further, HC trap catalyst temperature Tbed can be estimated from correlation with engine cooling water temperature Tw. Specifically, HC trap catalyst temperature Tbed can be calculated by searching a table shown in FIG. 18, based on engine cooling water temperature Tw detected by water temperature sensor 62. The table of FIG. 18 shows a characteristic of HC trap catalyst temperature Tbed relative to engine cooling water temperature Tw.

This application is based on prior Japanese Patent Application No. 2003-166044 filed on Jun. 11, 2003. The entire contents of the Japanese Patent Application No. 2003-166044 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A system for purifying exhaust gas passing through an exhaust passage in an engine, the system comprising:
    a HC trap catalyst disposed in the exhaust passage, the HC trap catalyst being operative to trap HC contained in the exhaust gas; and
    a control unit being programmed to:
    calculate a HC quantity which is trapped by the HC trap catalyst;
    calculate a temperature of the HC trap catalyst;
    judge whether or not the HC trap catalyst is activated;
    control a target excess air ratio to a preset value that is smaller than a normal value and determined based on the calculated HC quantity which is trapped by the HC trap catalyst and the calculated temperature of the HC trap catalyst, during a time period from starting the engine to judging that the HC trap catalyst is activated, to thereby rise an exhaust gas temperature; and
    when the calculated temperature of the HC trap catalyst is lower than a first temperature and the calculated HC quantity reaches an upper limit, the target excess air ratio is set to a value leaner than a value to which the target excess air ratio has been set before the calculated HC quantity reaches the upper limit.

2. The system as claimed in claim 1, wherein the control unit is further programmed to judge that the HC trap catalyst is activated when the calculated temperature of the HC trap catalyst is not less than the first temperature, the control unit being further programmed to control the target excess air ratio to a first preset value when the calculated temperature of the HC trap catalyst is lower than a second temperature lower than the first temperature, and control the target excess air ratio to a second preset value different from the first preset value when the calculated temperature of the HC trap catalyst is not less than the second temperature.

3. The system as claimed in claim 2, wherein the second preset value of the target excess air ratio is larger than the first preset value of the target excess air ratio.

4. The system as claimed in claim 2, wherein the second temperature of the HC trap catalyst is a temperature at which oxidation of the HC trapped by the HC trap catalyst is initiated.

5. The system as claimed in claim 2, wherein a sum of a heat quantity transported by the exhaust gas when the target excess air ratio is controlled to the second preset value, and a heat quantity generated upon oxidation of the HC trapped by the HC trap catalyst is larger than a heat quantity transported by the exhaust gas when the target excess air ratio is controlled to the first preset value.

6. The system as claimed in claim 1, wherein the engine comprises an intake throttle valve and an exhaust gas recirculation valve, the control unit being further programmed to control at least one of the intake throttle valve and the exhaust gas recirculation valve to thereby control the target excess air ratio.

7. The system as claimed in claim 1, wherein the control unit is further programmed to prohibit the control of the target excess air ratio to the preset value based on the calculated HC quantity trapped by the HC trap catalyst.

8. The system as claimed in claim 1, wherein the control unit is further programmed to:
    calculate a HC quantity discharged from the engine per unit time based on engine operating condition;
    correct the calculated HC quantity discharged based on the calculated temperature of the HC trap catalyst; and
    accumulate the corrected HC quantity discharged to thereby calculate the HC quantity trapped by the HC trap catalyst.

9. The system as claimed in claim 1, wherein the control unit is further programmed to calculate the temperature of the HC trap catalyst based on a temperature of the exhaust gas downstream of the HC trap catalyst.

10. The system as claimed in claim 1, wherein the control unit is further programmed to calculate the temperature of the HC trap catalyst based on a temperature of engine cooling water.

11. The system as claimed in claim 1, wherein the HC trap catalyst comprises an upstream catalyst and a downstream catalyst arranged in series in the exhaust passage.

12. The system as claimed in claim 1, wherein the control unit is further programmed to:
    calculate a temperature rise rate of the HC trap catalyst based on engine operating condition; and
    accumulate the calculated temperature rise rate to thereby calculate the temperature of the HC trap catalyst.

13. The system as claimed in claim 1, wherein the HC trap catalyst is designed to trap HC contained in the exhaust gas when a temperature of the HC trap catalyst is lower than an oxidation start temperature at which oxidation of the HC trapped by the HC trap catalyst is initiated.

14. A system for purifying exhaust gas passing through an exhaust passage in an engine, the system comprising:
    a HC trap catalyst disposed in the exhaust passage, the HC trap catalyst being operative to trap HC contained in the exhaust gas; and
    a control unit being programmed to:
    calculate a temperature of the HC trap catalyst;
    judge that the HC trap catalyst is activated when the calculated temperature of the HC trap catalyst is not less than a first temperature; and
    control a target excess air ratio smaller than a normal value during a time period from starting the engine to judging that the HC trap catalyst is activated, to thereby rise an exhaust gas temperature,
    wherein the control unit is programmed to control the target excess air ratio to a first preset value when the calculated temperature of the HC trap catalyst is lower than a second temperature lower than the first temperature, and control the target excess air ratio to a second preset value different from the first preset value when the calculated temperature of the HC trap catalyst is not less than the second temperature,
    wherein the control unit is programmed to set the target excess air ratio on the basis of a HC quantity which is trapped by the HC trap catalyst, when the calculated temperature of the HC trap catalyst is lower than the first temperature, and
    wherein the control unit is programmed to, when the calculated temperature of the HC trap catalyst is lower than the first temperature and the calculated HC quantity reaches an upper limit, set the target excess air ratio to a value leaner than a value to which the target excess air ratio has been set before the calculated HC quantity reaches the upper limit.

15. The system as claimed in claim 14, wherein the second preset value of the target excess air ratio is larger than the first preset value of the target excess air ratio and smaller than the normal value.

16. The system as claimed in claim 14, wherein the HC trap catalyst is designed to trap HC contained in the exhaust gas when a temperature of the HC trap catalyst is lower than an oxidation start temperature at which oxidation of the HC trapped by the HC trap catalyst is initiated.

17. A system for purifying exhaust gas passing through an exhaust passage in an engine, the system comprising:
   a HC trap catalyst disposed in the exhaust passage, the HC trap catalyst being operative to trap HC contained in the exhaust gas; and
   a control unit being programmed to:
      upon activating the HC trap catalyst after the engine is started, control a target excess air ratio to a preset value smaller than a normal value to which the target excess air ratio is controlled when the HC trap catalyst is activated, on the basis of a HC quantity which is trapped by the HC trap catalyst, to thereby rise an exhaust gas temperature;
      increase the target excess air ratio as a temperature of the HC trap catalyst rises, to thereby increase a heat quantity generated upon oxidation of the HC trapped by the HC trap catalyst; and
      when the temperature of the HC trap catalyst is lower than a first temperature and the HC quantity which is trapped by the HC trap catalyst reaches an upper limit, set the target excess air ratio to a value leaner than a value to which the target excess air ratio has been set before the HC quantity which is trapped by the HC trap catalyst reaches the upper limit.

18. A method for purifying exhaust gas passing through an exhaust passage in an engine, a HC trap catalyst being disposed in the exhaust passage and adapted to trap HC contained in the exhaust gas, the method comprising:
   calculating a temperature of the HC trap catalyst;
   judging whether or not the HC trap catalyst is activated based on the calculated temperature of the HC trap catalyst;
   controlling a target excess air ratio smaller than a normal value to which the target excess air ratio is controlled when the HC trap catalyst is activated, based on the calculated temperature of the HC trap catalyst and a HC quantity which is trapped by the HC trap catalyst, during a time period from starting the engine to judging that the HC trap catalyst is activated; and
   when the calculated temperature of the HC trap catalyst is lower than a first temperature and the HC quantity which is trapped by the HC trap catalyst reaches an upper limit, setting the target excess air ratio to a value leaner than a value to which the target excess air ratio has been set before the calculated HC quantity which is trapped by the HC trap catalyst reaches the upper limit.

19. The method as claimed in claim 18, wherein the judging operation comprises judging that the HC trap catalyst is activated when the calculated temperature of the HC trap catalyst is not less than a first temperature, the controlling operation comprising controlling the target excess air ratio to a first preset value when the calculated temperature of the HC trap catalyst is lower than a second temperature lower than the first temperature, and controlling the target excess air ratio to a second preset value larger than the first preset value and smaller than the normal value when the calculated temperature of the HC trap catalyst is not less than the second temperature.

20. The method as claimed in claim 18, further comprising calculating a HC quantity trapped by the HC trap catalyst.

21. The method as claimed in claim 20, further comprising prohibiting the controlling the target excess air ratio smaller than the normal value based on the HC quantity trapped by the HC trap catalyst.

* * * * *